(12) United States Patent
Kim (10) Patent No.: US 8,939,483 B2
(45) Date of Patent: Jan. 27, 2015

(54) HANDLE STRUCTURE FOR A PORTABLE TERMINAL

(76) Inventor: Yong Sun Kim, Gunsan-si (KR)

( * ) Notice: Subject to any disclaimer, the term of this patent is extended or adjusted under 35 U.S.C. 154(b) by 0 days.

(21) Appl. No.: 14/114,910

(22) PCT Filed: May 3, 2012

(86) PCT No.: PCT/KR2012/003499
§ 371 (c)(1),
(2), (4) Date: Oct. 31, 2013

(87) PCT Pub. No.: WO2012/153943
PCT Pub. Date: Nov. 15, 2012

(65) Prior Publication Data
US 2014/0054910 A1    Feb. 27, 2014

(30) Foreign Application Priority Data

May 6, 2011 (KR) .................... 20-2011-0003880 U
Jun. 10, 2011 (KR) ........................ 10-2011-0056477

(51) Int. Cl.
*A45F 5/00* (2006.01)
*H04M 1/02* (2006.01)
*H04B 1/38* (2006.01)

(52) U.S. Cl.
CPC ............. *H04M 1/0279* (2013.01); *H04B 1/385* (2013.01); *H04B 1/3888* (2013.01); *A45F 2200/0525* (2013.01); *H04B 2001/3861* (2013.01)
USPC ........................................... 294/25; 224/217

(58) Field of Classification Search
CPC ................... A45F 2200/0516; A45F 220/0525
USPC ............ 294/25, 137, 142, 165; 224/217, 218, 224/930
See application file for complete search history.

(56) References Cited

U.S. PATENT DOCUMENTS

| | | | | |
|---|---|---|---|---|
| 8,374,657 B2 * | 2/2013 | Interdonato | ................ | 455/575.4 |
| 8,428,664 B1 * | 4/2013 | Wyers | ........................ | 455/575.1 |
| 8,550,317 B2 * | 10/2013 | Hyseni | .......................... | 224/197 |
| 8,567,832 B2 * | 10/2013 | Kannaka | ......................... | 294/25 |

(Continued)

FOREIGN PATENT DOCUMENTS

| | | |
|---|---|---|
| JP | 2002-199070 B1 | 7/2002 |
| JP | 2006-279907 A | 10/2006 |

(Continued)

OTHER PUBLICATIONS

International Search Report of PCT/KR2012/003499 mailed on Nov. 28, 2012 from ISA/KR.

*Primary Examiner* — Dean Kramer
(74) *Attorney, Agent, or Firm* — Revolution IP, PLLC (57) ABSTRACT

Disclosed is a handle structure formed on the rear surface of the portable terminal, which comprises: fixing holes parallel formed in an shape on the rear surface; and a belt-type handle of which both ends are inserted and fixed into the fixing holes. The belt-type handle comprises: a fixing part, folded parts, and a human body contact part extending from and connecting both folded parts. The human body contact part has a curved shape the width of which is narrow at the center and gradually increases toward both folded parts. Each of the folded parts has a cylindrical shape, and a silicone layer is pressed and attached to the inner surfaces of the folded parts. The silicone layer extends to surround a hole jaw within each of the fixing holes.

12 Claims, 10 Drawing Sheets

(56) References Cited

U.S. PATENT DOCUMENTS

2005/0205623 A1* 9/2005 Buntain ............... 224/217
2011/0309117 A1* 12/2011 Roberts ............... 224/217

FOREIGN PATENT DOCUMENTS

| KR | 20-0230258 Y1 | 7/2001 |
| KR | 10-2011-0016618 A | 2/2011 |

* cited by examiner

HANDLE STRUCTURE FOR A PORTABLE TERMINAL

CROSS REFERENCE TO PRIOR APPLICATIONS

This application is a National Stage Application of PCT International Patent Application No. PCT/KR2012/003499 filed on May 3, 2012, under 35 U.S.C. §371, which claims priority to Korean Utility Model Application No. 20-2011-0003880 filed on May 6, 2011, and Korean Patent Application No. 10-2011-0056477 filed on Jun. 10, 2011, which are all hereby incorporated by reference in their entirety.

TECHNICAL FIELD

The present invention relates to a handle structure for a portable terminal, and more particularly, to a band (belt)-type handle structure installed on a rear surface of the portable terminal such as a smartphone.

BACKGROUND ART

Recently portable terminals with a larger screen are released by virtue of technological progress.

However, the larger screen of the portable terminal inevitably causes the width of the terminal to be increased, which in turn makes it difficult for users with smaller hands to operate the terminal while holding it with one hand.

In view of the foregoing, the present inventor has solved the problem by attaching a band (belt)-type handle to a rear surface of the smartphone to form a more convenient structure so that users with smaller hands can readily operate the phone even with one hand without deforming the appearance such as the thickness of the phone.

SUMMARY OF INVENTION

Technical Problem

It is an object of the present invention to provide a portable terminal, in particular, a smartphone, with a handle that can support the terminal.

It is another object of the present invention to provide a structure in which a handle is mounted to a rear cover itself of a terminal or a structure in which the handle is to be mounted to a separate cover.

It is yet another object of the present invention to provide a structure providing a portable terminal with a handle that is convenient and comfortable to users.

Solution to Problem

In order to achieve the purposes, the present invention provides a handle structure formed on a rear surface 1 of a portable terminal, which includes fixing holes 3 and 3' parallel formed in an "11" shape on a rear cover of the terminal and a belt-type handle 5 of which both ends 51 and 51' are inserted and fixed into the fixing holes.

The belt-type handle 5 includes a fixing part 51, folded parts 55, and a human body contact part 53 extending from both of the folded parts. When the human body contact part is made to be curved such that a width of a central portion thereof is small and becomes larger toward both of the folded parts, twisting can be prevented, a finger can be readily inserted in use, and the terminal can be grabbed with ease.

When a portion at which the human body contact part starts is made to be a portion slightly spaced apart from the folded part, a guiding wing 54 having a smaller tensile force in use is formed to guide the finger to be inserted, which is thus more preferable.

The folded part 55 is formed to be cylindrical, and a silicone layer 57 is pressed and formed to a surface inside the folded part. When the silicone layer extends to surround a hole jaw 33 within each of the fixing holes 3 and 3', elasticity becomes better and the folded part can be prevented from being readily worn out.

The folded part 55 and the fixing parts 51 and 51' preferably have a thickness of 30% to 70% of the human body contact part 53. Thicknesses of both ends of the belts serving as the fixing parts of the belt are made in consideration of a space between internal components (a rear surface of the case in a case of the protection cover) positioned inside the rear surface. In addition, the fixing parts 51 and 51' of the belt-type handle are preferably inserted into respective fixing holes 3 and 3' such that the fixing parts are attached and fixed to an internal surface of the rear surface of the terminal to face each other.

The hole jaw 33 of the fixing holes 3 and 3' is rounded in a direction in which both ends 51 and 51' of the belt serving as fixing parts of the handle make process and is formed in parallel with a width direction (a short side) of the portable terminal, and the belt-type handle 5 is mounted in the longitudinal direction (a long side) of the portable terminal.

The rear surface 1 of the portable terminal may be a rear cover of the portable terminal itself, a rear surface of the protection cover additionally mounted to the portable terminal, or a mounting plate separately attached thereto.

Advantageous Effects of Invention

In accordance with an embodiment, a handle that can support the portable terminal, in particular, the smartphone can be provided.

In accordance with an embodiment, a structure in which a handle is mounted to a rear cover itself of a terminal or a handle mounted to a separate protection cover can be provided.

In accordance with an embodiment, a handle for a portable terminal having a structure that is convenient and comfortable to users can be provided.

Figure 9:
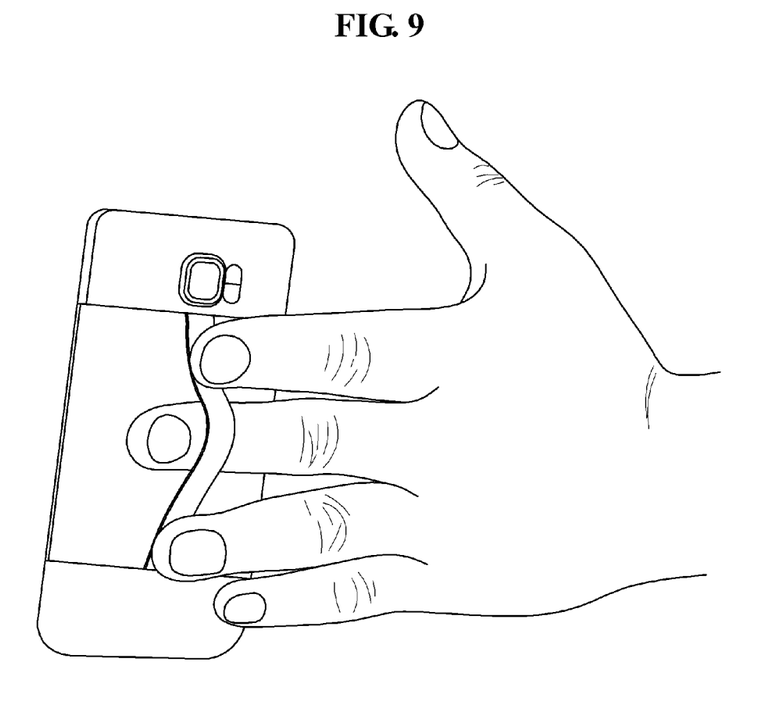
FIGS. 9, 10, and 11 are use state views.
Figure 10:
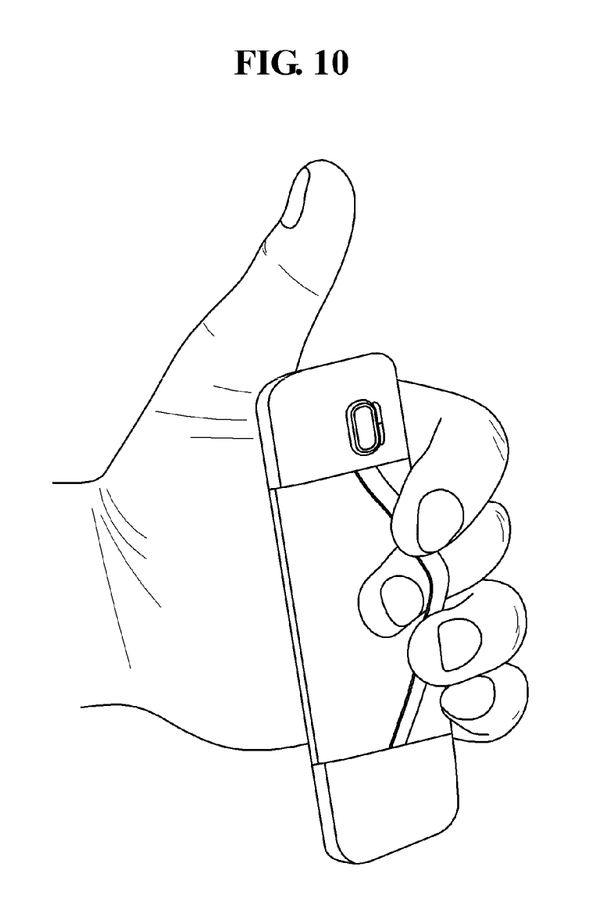

In particular, when the middle finger is inserted between the smartphone and the handle belt as shown in FIG. 9 and fingers are closed toward the phone (FIG. 10) while slightly pressing the phone with the index and ring fingers, the phone can be fixed to the hand only with one to three fingers without being affected from the palm of the hand or the thumb.

The screen of the phone is conventionally touched with the thumb while holding the side of the phone with the rest fingers and the palm. However, according to the present invention, the phone can be held only with the end of the finger being fit into the belt, so that the use range of the thumb can be increased and the risk of accidently dropping the phone can be significantly reduced.

Anyone including users with small hands can thus freely use the smartphone or the tablet PC with a large screen only with one hand.

BEST MODE OF CARRYING OUT THE INVENTION

Hereinafter, the present invention will be described with reference to accompanying drawings for better understanding the spirit of the present invention. The term 'portable terminal' used herein collectively refers to a portable phone, a smartphone, a tablet PC, a PDA, a PMP, or the like.

Figure 7:
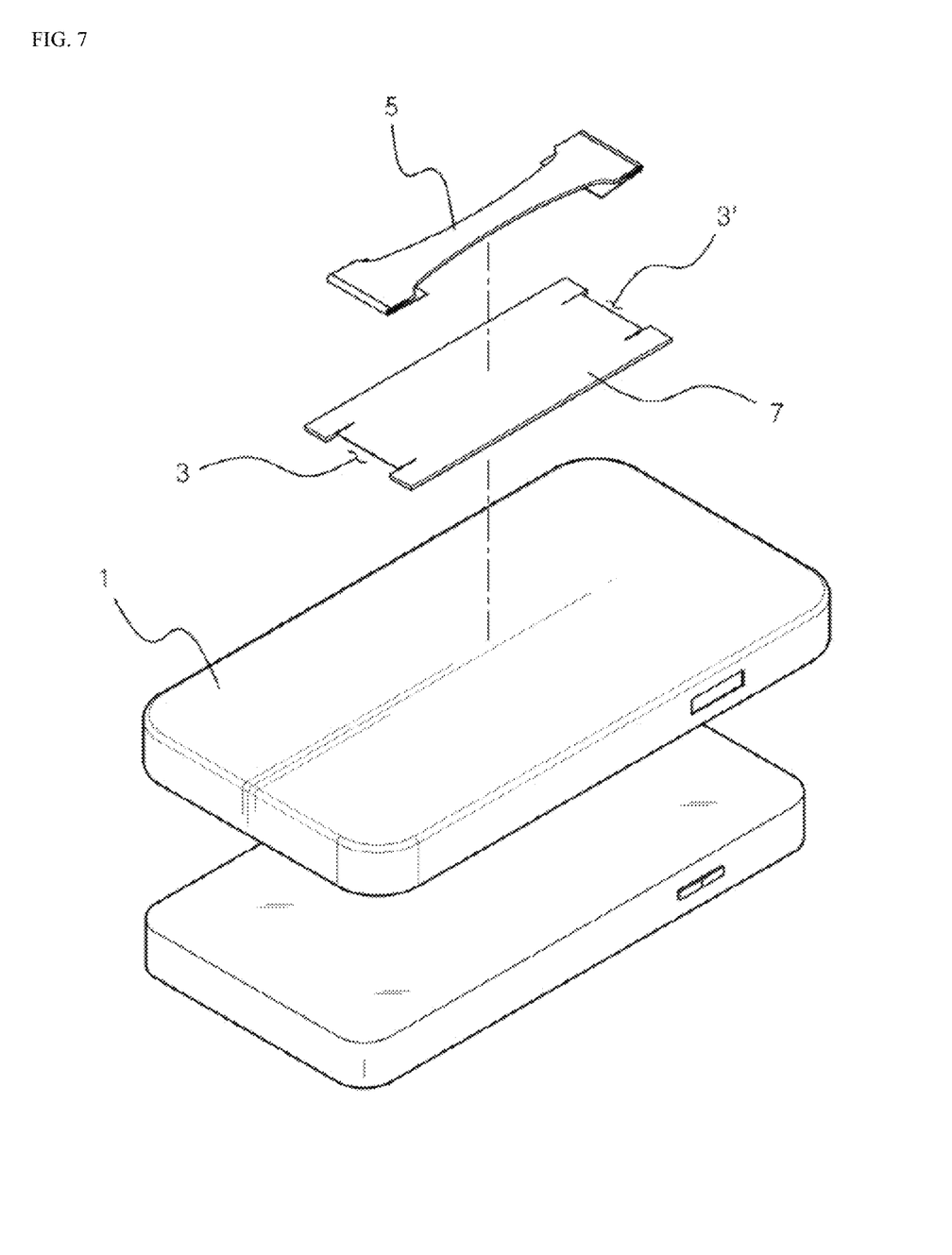
FIG. 7 is a disassembled perspective of an embodiment using a separate mounting plate.
Figure 8A:
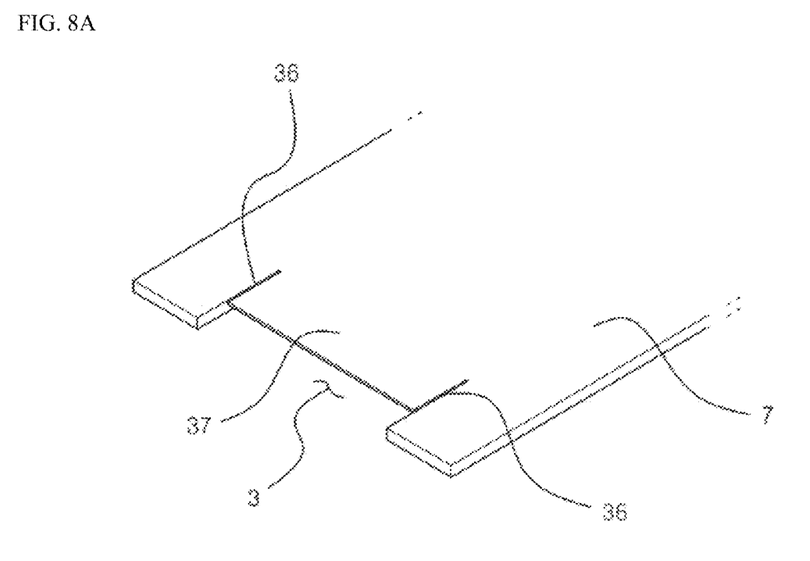
FIG. 8 is a structural view of a fixing part formed in the mounting plate of FIG. 7.
Figure 11:
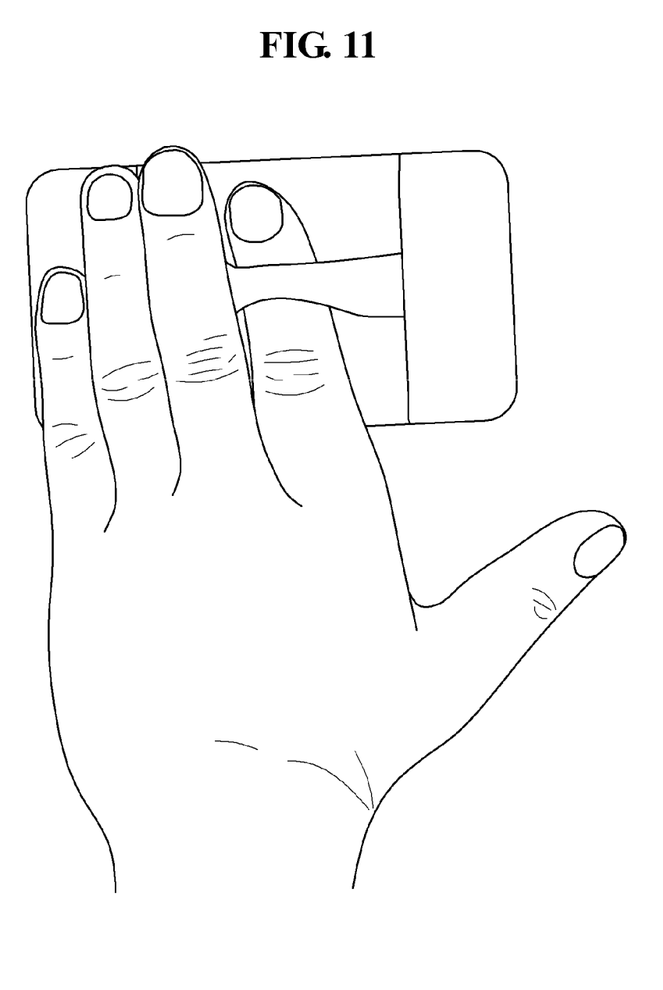

The term 'rear surface 1' used herein refers to a cover surface of the rear portion of the phone (hereinafter, also referred to as 'equipment') body case or a surface of a protection cover mounted to the rear portion of the phone body case. That is, the embodiment of FIGS. 1 to 6 corresponds to the present invention implemented in the protection cover, and FIGS. 9 to 11 correspond to the present invention implemented in the rear surface of the phone body. FIGS. 7 and 8 correspond to an embodiment in which the mounting plate 7 is used for the rear surface of the phone body or the protection cover.

The term 'belt-type handle' used herein may include similar types to the band type in addition to the band type. Accordingly, the term 'belt-type handle' used herein are not limited to the belt-type and may be used to include other similar types.

Figure 1:
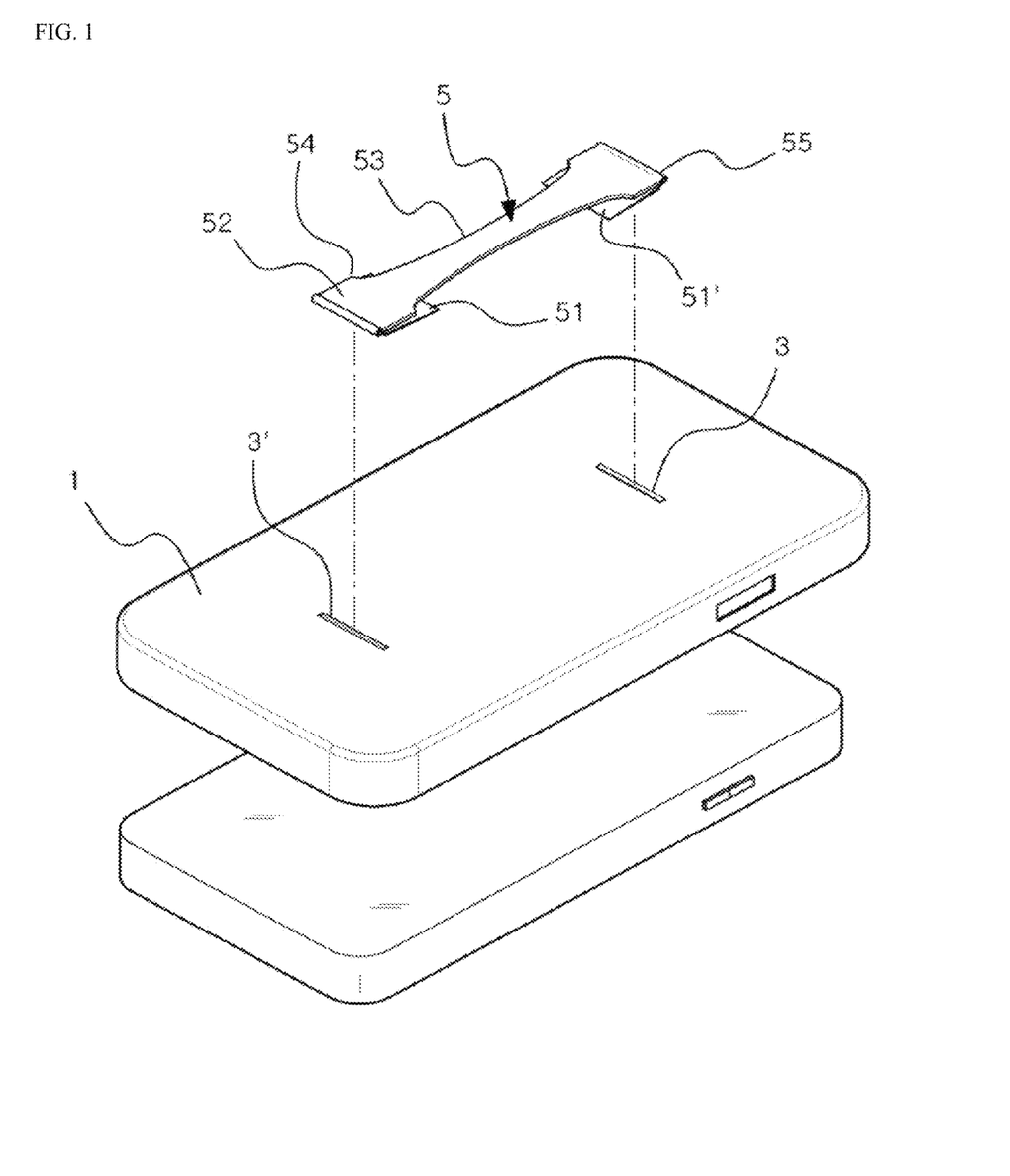
FIG. 1 is a disassembled perspective view illustrating a terminal handle of the present invention.
Figure 3:
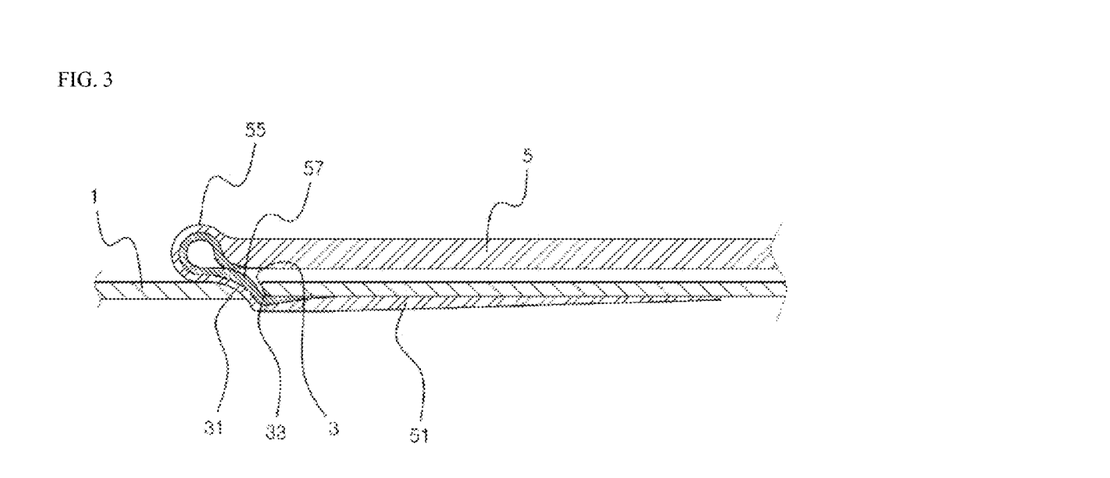
FIG. 3 is a cross-sectional view taken along line A-A of FIG. 2.

FIG. 1 is a disassembled view illustrating the belt-type handle on the protection cover of the smartphone in accordance with an embodiment of the present invention. Two fixing holes 3 and 3' each having a '—' shape are formed on the rear surface 1 of the protection cover (a surface in the drawing) to be coupled to a rear surface of the smartphone itself (with not referential number) and parallel disposed in an '11' shape. Both belt ends 51 and 51' as fixing parts of the belt-type handle are inserted into the respective fixing holes 3 and 3' and are fixed to an opposite surface (inner surface) of the protection cover (FIGS. 3 and 4).

Figure 4:
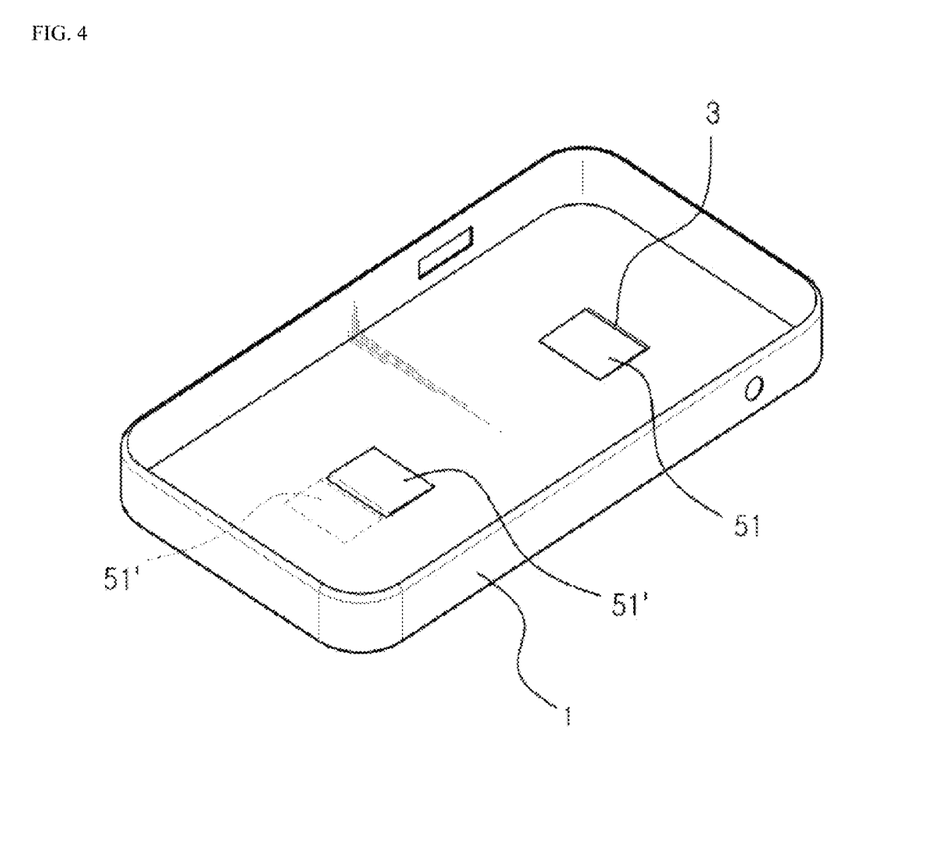
FIG. 4 is a perspective view illustrating an inside of a terminal cover to which the present invention is applied.

In this case, both belt ends 51 and 51' may be folded and bonded to face each other as shown in FIG. 1 or may be folded and bonded to face against each other (dotted line in FIG. 4).

Figure 2:
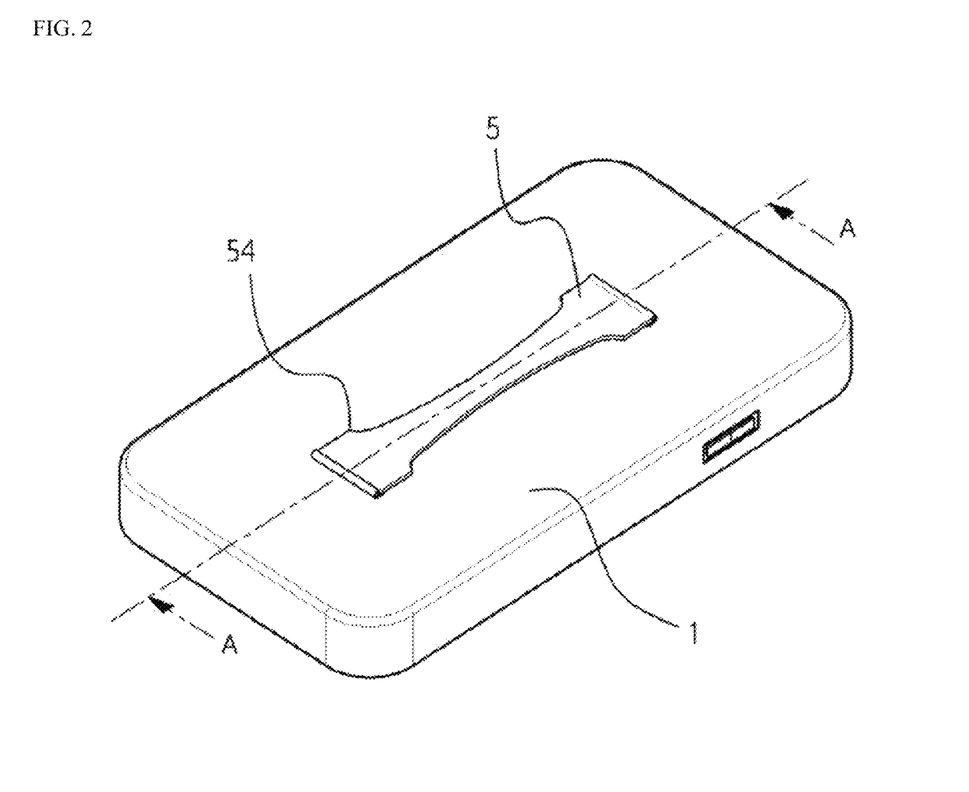
FIG. 2 is a state view illustrating an assembled terminal handle of the present invention.

A reference numeral 54 of FIGS. 1 and 2 is a guide wing formed on the handle belt in the fixing holes 3 and 3'. The guide wing 54 is formed in a portion in which the portion at which a human body contact part starts is slightly spaced apart from the folded part, and slightly protrudes at the same time when a smaller tension force is applied thereto in use, thereby serving to allow the finger to be more readily inserted.

In this case, bonding is merely one means for fixation and other methods may be employed. However, bonding is more preferable than other methods because a manufacturing unit cost is low, a process is facilitated, a lesser impact is applied on the appearance of the product, and a fixing force is good.

The handle 5 (if necessary, also referred to as 'belt') preferably has a shape such that a width decreases toward a central portion from both folded parts 55 serving as a joint as shown in FIGS. 1 and 2.

One finger is fit into the handle of the present invention in use. When both edges of the belt are gradually inclined toward the central portion, the inclined surface causes the finger to be naturally moved along the inclined surface, thereby readily making the finger fit into the central portion with a smaller width in the rear surface of the phone.

In addition, the curved shape of the human body contact part 53 (finger fitting part) has advantages in that fitting sensation is good because of a small contact area between the belt and the back of the finger fit into the inside of the belt in use, a resistance is low when a direction of the phone is switched in accordance with the need of the user, and the central portion of the belt can be prevented from being rolled (twisted).

FIG. 2 is an assembled view in which components of the present invention are assembled. As shown in FIG. 2, the position to which the belt-type handle is to be mounted is preferably a central position of the phone in a longitudinal direction of the phone. However, the position is not necessarily the exact central position and may be a similar position.

FIG. 3 is a cross-sectional view taken along line A-A of FIG. 2. Both ends 51 of the belt serving as the fixing parts are preferably wider and thinner than the human body contact part 53 of the belt. Each of the folded part 55 and the fixing part 51 has a thickness of 20% to 70%, preferably, about 40%, of the human body contact part 53.

By doing so, the folded part and the fixing part can be received in a small space between the inside of the phone (or the rear surface of the phone) and the cover so that internal components of the phone (or the rear surface of the phone) are not pressed, a flexible joint function can be provide to the folded part 55, and a bonding surface can be increased in the thin rear surface, thereby dispersing a cutting pressure due to the tensile force delivered through the fixing holes 3 and 3' in use.

As shown in FIG. 3, the belt may be readily mounted to and spaced apart from the surface of the phone when the folded part 55 corresponding to the joint has a cylindrical shape, and the joint movement becomes smooth to have a better feeling of using the phone when an elastic layer 57 such as silicone is formed inside the folded part.

When a hole jaw 33 of the fixing hole through which the belt passes is rounded in a direction in which both belt ends serving as the fixing parts make progress as shown in FIG. 3, the joint function of the folded part 55 can be smoothly carried out and the damage on the belt resulting from the contact portion of the hole jaw can be delayed. The reference numeral 31 that is not explained is an outside hole jaw, which is also made to be concave in the present embodiment.

In addition, it is the most preferable that the belt is made of a material having a good skin reaction while having suitable elasticity and strong tensile force. This material may include, but not limited to, natural leather, a tough and flexible synthetic yarn, and a flexible bonding material such as silicone.

Figure 5A:
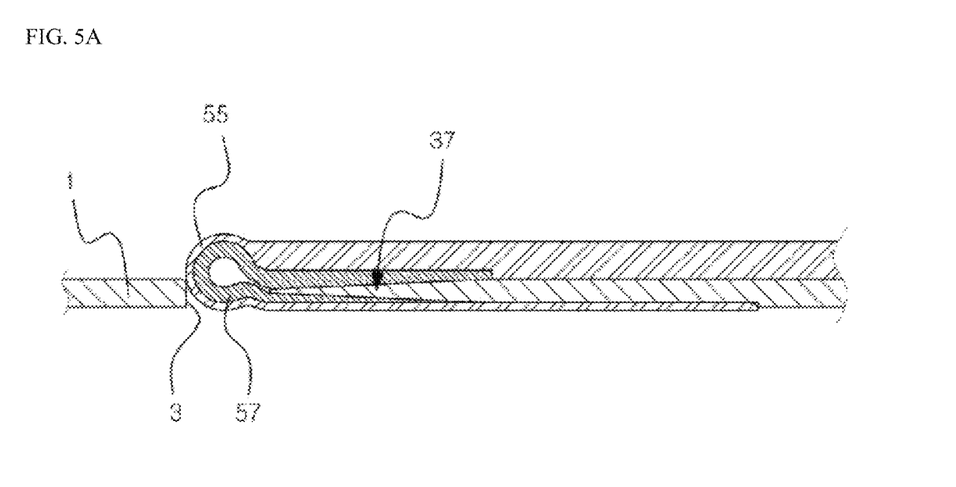
FIGS. 5A and 5B are cross-sectional views illustrating other embodiments of a belt-type handle.
Figure 5B:
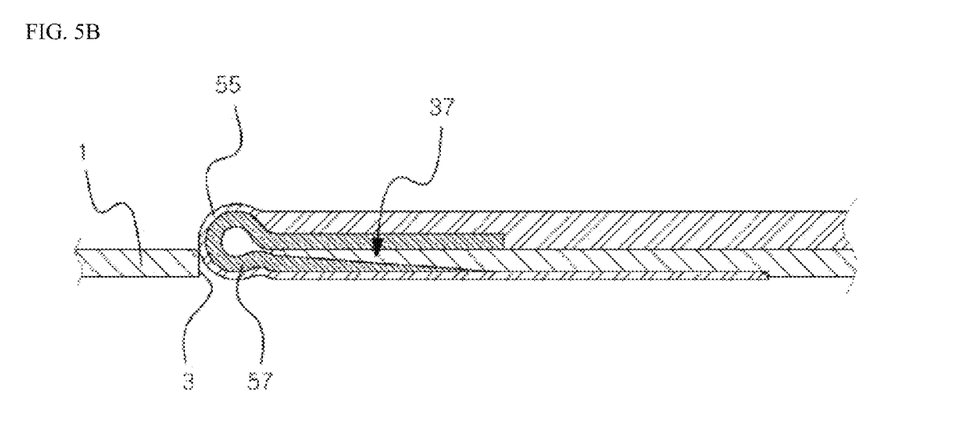

FIG. 5 is a cross-sectional view illustrating another structure in which the belt-type handle 5 is coupled. The present embodiment differs from the embodiments described above in that the fixing holes 3 and 3' are larger to allow the folded part 55 to be received within the fixing hole and cutting parts 36 are formed on both ends of the internal hole jaw 33 to make the hole jaw an elastic piece 37.

Increasing the size of the fixing hole is intended to cause a round portion of the upper surface of the folded part 55 not to protrude and also to cause the handle belt 5 to be closely attached to the surface of the phone while the finger is not fit into the handle belt 5. Making the internal hole jaw 33 the elastic piece 37 is also intended to assist in the functions described above.

In other words, the elastic piece 37 causes the both ends 51 and 51' of the belt serving as the fixing parts of the handle belt to be in close contact with the surface of the phone in a normal state. The elastic piece 37 is bent upward when a stronger force is applied to the internal hole jaw 33 and returns to its original position when the force is weakened.

FIG. 5A illustrates a surface and a rear surface of the elastic piece made to be inclined, and FIG. 5B illustrates that only the rear surface is inclined. When the surface and/or the rear surface of the elastic piece is inclined toward the internal hole jaw, both ends 51 and 51' of the belt serving as the fixing parts are preferably inclined accordingly.

Figure 6A:
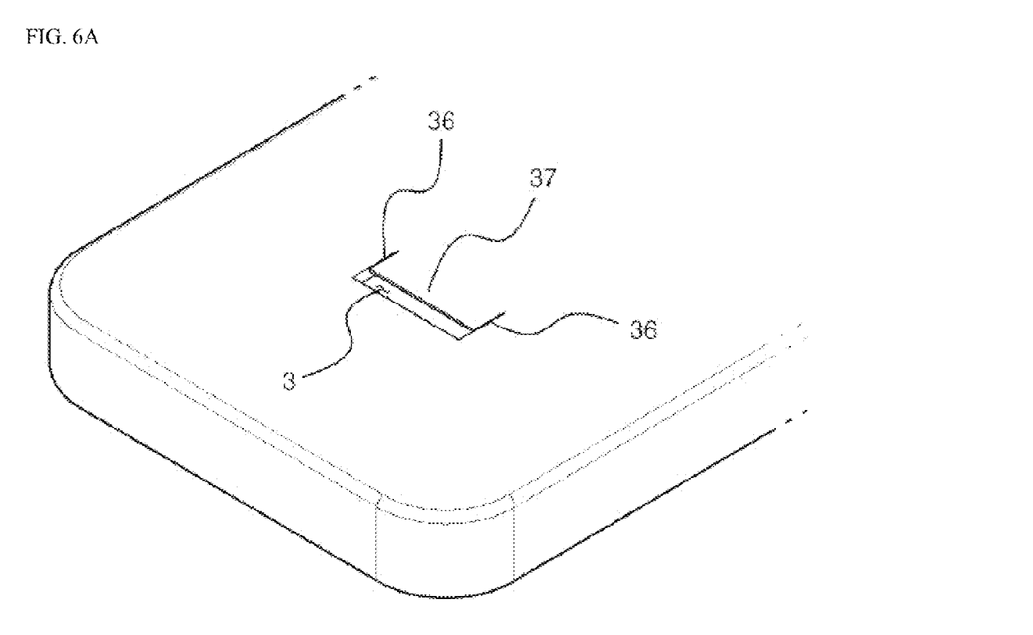
FIGS. 6A and 6B are a surface view and a rear view illustrating another embodiment of fixing holes.
Figure 6B:
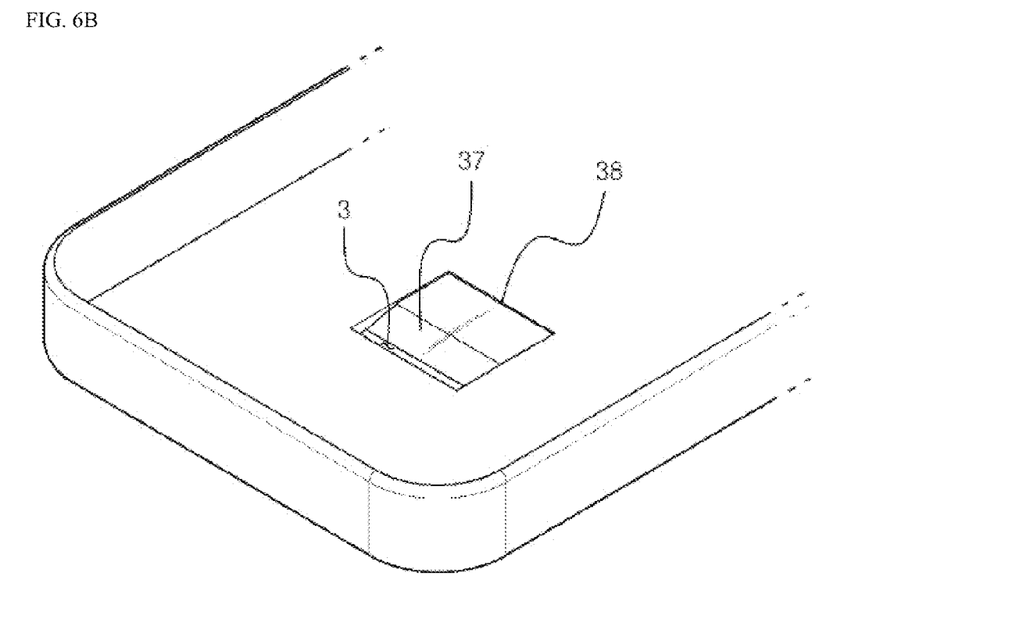

FIGS. 6A and 6B are surface and rear surface views illustrating the internal hole jaw 33 as the elastic piece 37 using the cutting part 36 and the fixing hole 3 shown in FIG. 5A. A step 38 is formed at the end of the inclined surface opposite to the internal hole jaw in a case of the rear surface (bottom surface) of the elastic piece as shown in FIGS. 5 and 6 in the present invention. However, it is preferable that the step is not formed in the surface.

Figure 8B:
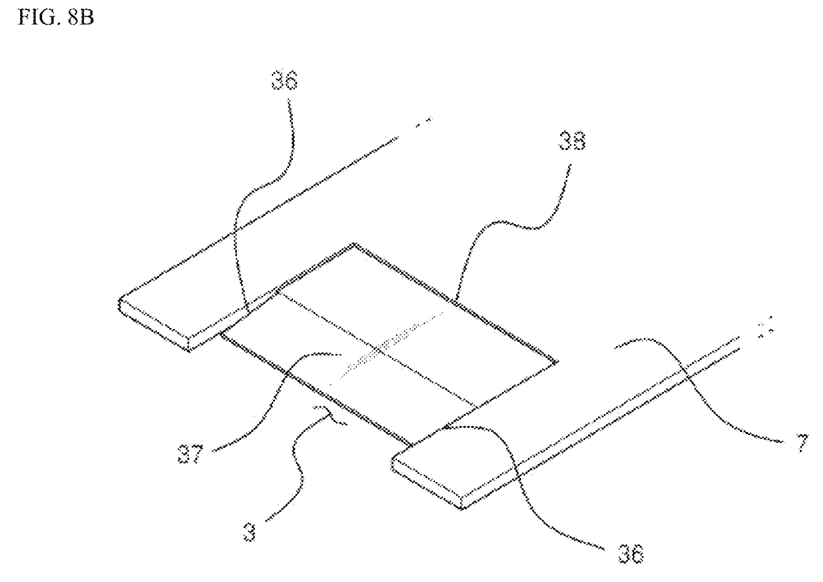

FIG. 7 illustrates an example in which the handle belt 5 is mounted to the rear surface 1 of the phone using a separate mounting plate 7, which is different from the embodiments described up to now. In this case, the fixing holes 3 and 3' are formed when the rear surface 1 of the protection cover or the phone body is coupled with the inclined surface below the internal hole jaw 33 of the mounting plate 7 shown in FIG. 8B.

In the present embodiment, the mounting plate 7 is made to be a little bit larger than the width of the handle belt 2, and shapes of the hole jaw or both ends of the handle belt serving as the fixing parts are the same as those in the embodiment described above. The mounting plate is shown as an edged plate in the present embodiment. However, it will be preferable that the edge of the mounting plate is actually rounded or inclined so that the finger of the user is not stuck.

The embodiments described above have been described in terms of concept for the sake of clarifying the spirit of the present invention. The protection scope of the present invention should thus be determined not by the embodiments described above but by the following claims.

The invention claimed is:

1. A handle structure formed on a rear surface (1) of a portable terminal, the handle structure comprising:
    fixing holes (3 and 3') formed in parallel on the rear surface of the portable terminal; and
    fixing parts (51 and 51') of a belt-type handle (5) inserted and fixed into the fixing holes,
    wherein the belt-type handle (5) includes folded parts (55) and a human body contact part (53), the human body contact part (53) extending from the folded parts (55), each of the folded parts (55) being folded between the human body contact part (53) and one of the fixing parts (51 and 51') and spaced apart from each of the fixing holes (3 and 3') with a distance.

2. The handle structure according to claim 1, wherein the human body contact part has a curved shape of which the width is narrow at a central portion and gradually increases toward both of the folded parts.

3. The handle structure according to claim 2, wherein a guide wing (54) is formed between the human body contact part (53) and the folded part (55).

4. The handle structure according to claim 1, wherein each of the folded parts (55) has a cylindrical shape, a silicone layer (57) is pressed and formed to inner surfaces of the folded parts, and the silicone layer extends to surround a hole jaw (33) within each of the fixing holes (3 and 3').

5. The handle structure according to claim 4, wherein the hole jaw (33) of each of the fixing holes (3 and 3') is rounded.

6. The handle structure according to claim 4, wherein the hole jaw (33) within each of the fixing holes (3 and 3') is formed of an elastic piece (37) that has a cutting part (36) and can be bent.

7. The handle structure according to claim 6, wherein a surface and/or a rear surface of the elastic piece (37) is inclined toward the internal hole jaw (33).

8. The handle structure according to claim 1, wherein the fixing parts (51 and 51') of the belt-type handle are inserted into respective fixing holes (3 and 3') and are bonded and fixed to an internal surface of the rear surface of the terminal such that both ends of the fixing parts face each other or face against each other.

9. The handle structure according to claim 1, wherein the fixing holes (3 and 3') are formed in parallel with a width direction of the portable terminal so that the belt-type handle (5) is mounted in a longitudinal direction of the portable terminal.

10. The handle structure according to claim 1, wherein the fixing holes (3 and 3') are directly punched into the rear surface of the portable terminal or the rear surface (1) of a protection cover.

11. The handle structure according to claim 1, wherein the fixing holes (3 and 3') are formed by grooves recessed in both ends of a mounting plate (7) and the rear surface of a protection cover or the rear surface of the portable terminal.

12. The handle structure according to claim 1, wherein the belt-type handle (5) is formed of leather or fabric.

\* \* \* \* \*